United States Patent [19]
Stabler

[11] Patent Number: 5,937,047
[45] Date of Patent: Aug. 10, 1999

[54] REMOTE VOICE MAIL MESSAGING AND MANAGEMENT SYSTEM

[76] Inventor: Jerry Stabler, 5849 Okeechobee Blvd., Ste 201, West Palm Beach, Fla. 33417

[21] Appl. No.: 08/869,816

[22] Filed: Jun. 5, 1997

Related U.S. Application Data

[63] Continuation of application No. 08/541,239, Jan. 2, 1995, abandoned.

[51] Int. Cl.[6] .................................................... H04M 3/42
[52] U.S. Cl. .......................... 379/201; 379/214; 379/67.1
[58] Field of Search .............................. 379/67.1, 69, 79, 379/84, 87, 201, 203, 204, 207, 210, 211, 212, 213, 214, 215, 216, 233, 235, 236

[56] References Cited

U.S. PATENT DOCUMENTS

| | | | |
|---|---|---|---|
| 4,757,267 | 7/1988 | Riskin | 379/113 |
| 5,151,935 | 9/1992 | Slife et al. | 379/240 |
| 5,172,404 | 12/1992 | Hashimoto | 379/67 |
| 5,175,761 | 12/1992 | Khalid | 379/67.1 |
| 5,179,585 | 1/1993 | MacMillan, Jr. et al. | 379/67.1 |
| 5,187,735 | 2/1993 | Garcia | 379/67.1 |
| 5,199,062 | 3/1993 | Von Meister et al. | 379/67.1 |
| 5,255,314 | 10/1993 | Applegate et al. | 379/212 |
| 5,260,990 | 11/1993 | Melampy et al. | 379/67.1 |
| 5,329,578 | 7/1994 | Brennan | 379/67.1 |
| 5,333,186 | 7/1994 | Gutpa | 379/201 |
| 5,349,636 | 9/1994 | Irribarren | 379/89 |
| 5,422,941 | 6/1995 | Hasenauer et al. | 379/207 |
| 5,459,779 | 10/1995 | Backaus et al. | 379/201 |
| 5,515,422 | 5/1996 | MeLampy et al. | 379/67.1 |

Primary Examiner—Scott Weaver
Attorney, Agent, or Firm—McHale & Slavin, PA

[57] ABSTRACT

A remotely located voice massaging and management system incorporating conventional telephone switching technology. The system provides for processing and handling of multiple calls and integration of Voice/Fax messaging to accomplish various applications. Applications include the ability to provide concierge, yellow page, and company directory service by sharing of resources. The sharing allows individuals and small businesses to obtain professional voice mail services possible only with large capital expenditures. The system is dependent upon the AT&T 5ESS or 1A switch to transfer calls by use of hook and flash capability to free the incoming telephone line of the VMS for continued transfer of the call.

12 Claims, 7 Drawing Sheets

FIG. 2

LOOP TO B&M CONVERSION WIRING INFORMATION

| WESCOM 3656 | WESCOM 7360 | | WESCOM 7301 | TRILOG EAM PORT | |
|---|---|---|---|---|---|
| TIP  | 53 | 49 | 5   | 7  | T1 |
| RING | 47 | 51 | 15  | 13 | R1 |
|      |    | 43 |     |    | E  |
|      |    | 15 |     |    | M  |
|      | A  | 23 | 3   |    |    |
|      | B  | 19 | 1   |    |    |
|      | -48V | 35 |   |    |    |
|      | Ground | 17 | |    |    |
| TIP  | 53 | 49 | 55  | 4  | T1 |
| RING | 47 | 51 | 49  | 4  | R1 |
|      |    | 43 |     |    | E  |
|      |    | 15 |     |    | M  |
|      | A  | 23 | 53  |    |    |
|      | B  | 51 | 51  |    |    |
|      | -48V | 35 |   |    |    |
|      | Ground | 17 | |    |    |

OPTION NOTES 7301  600 Ohms Both Sides of Circuit

7360 A Closed
     C Closed
     D Open
     E Closed
     F Open
     J Open
     H Closed

REMOTE VOICE MAIL MESSAGING AND MANAGEMENT SYSTEM

This application is a continuation of 08/541,239 filed Jan. 2, 1995 abandoned.

FIELD OF THE INVENTION

This invention relates to voice mail systems and, more particularly, to an improvement in remotely located voice mail answering systems.

BACKGROUND OF THE INVENTION

Basic voice mail answering systems have become popular business tools for routing customers. Voice mail systems are basically a database access system that permits a caller to access the database information over the telephone call by converting stored audible voice signals for playback upon demand. Common to all voice mail systems is the ability to record a personal message should the person to whom the call is routed be unavailable. Thus, an obvious benefit provided by voice mail systems is the ability to remove an employee from mundane telephone answering duties allowing the employee to be used for more productive matters.

For instance, larger companies find the use of an in-house operator a valuable service for answering and directing incoming telephone calls. This is particularly true if the operator is also capable of answering various informational requests posed by a customer. However, since directing of telephone calls is typically repetitive and has peak demands, multiple employees could be necessary to properly address the calling.

Mid-sized companies can ill afford to pay for in-house operators. Answering of the telephone is typically assigned to a receptionist whose primary duty is welcoming visitors to the company. In these instances the receptionist becomes a valuable asset to the company if the receptionist is also able to respond to customer inquiries and send out information if requested.

Small companies may not be able to justify a receptionist, delegating the duties of answering the phone to a secretary or even to the owner of the company. With a limited staff, the probability of the phone being unanswered or having a delay in answering is high. Typically, when no employee is available to answer the phone call, the call may go unanswered or the call is recorded on a conventional telephone recorder. The use of a conventional recorder has the obvious disadvantage of not providing the customer with answers to various questions that may have been presented during the initial phone conversation.

A popular alternative to in-house telephone answering is the use of answering services. Answering services are independent companies that provide telephone answering services for a fixed fee. The company that retains the telephone answering service simply calls the answering service during the day to obtain messages. Alternatively, the telephone answering service may page a company employee by use of a beeper to signal that calls have been received.

A problem with telephone answering services is that the person answering the telephone may not be able to communicate information about the company so requested by the caller. Private personalized messages are not possible since the operator must write down the message conveyed. In certain situations, the telephone caller may not realize the answering service is not part of the company called and the inability of the answering service to answer otherwise simple questions may leave the caller with a bad impression of the company. The incoming callers may be acutely aware that their call is being answered remotely and believe that the business they are working with is so small that they may not be able to accommodate their needs. This is especially prevalent when an answering service employs the services of a person who does not answer the phone in a convincing manner or simply states that the calls are being forwarded to the answering service.

For these reasons, the use of in-house voice mail systems have become very popular with small, mid-size, as well as large businesses. Not only is the voice mail efficient in directing the incoming telephone call, but also for its ability to direct caller inquires should information be requested. Large companies are able to use the operators for more productive tasks, mid-size companies can use the receptionist for their intended purpose, and small companies do not appear understaffed. A primary problem with voice mail systems is their expense and installing a professional voice mail system could range upwards of $200,000, in 1994 dollars, for equipment only, not including maintenance.

As an alternative to in-house voice mail systems, the use of remotely answered telephones using professional voice mail systems provide businesses with a cost effective alternative to the professional voice mail system. By use of conventional telephone technology, a business owner can forward his/her telephone calls to a remotely located answering service who will respond to the incoming caller as if the answering service was located on the business premises. Voice mail systems are well known in the art wherein depression of TOUCH TONE keys on a remote telephone key pad prompts an incoming caller through various functionalities. The voice mail system may be programmed to automatically connect with a particular department or individual or simply used to deliver messages stored in what is known as an electronic mailbox. The incoming caller may record a personal message to any individual having a voice mail recording location on the system. However, the telephone line of the company will be busy while the call is in progress causing subsequent callers to receive a busy signal. If the voice mail system has multiple options, the call could take minutes to transpire. For this reason, multiple lines could be required during peak calling periods. This added expense detracts from the benefits gained by having voice mail system.

Thus, what is needed is a remote automated voice mail messaging and management service that utilizes two wire DID with hook flash transfer technology so as to provide multiple telephone line similarity from as few lines as possible.

SUMMARY OF THE INVENTION

The instant invention is a remote voice mail attendant providing messaging and management services over a conventional telephone system. An inbound caller calls the remote voice mail system by direct dialing of the business phone number wherein a call forwarding feature, such as that provided by the telephone company, forwards the call to the remote voice mail system. Alternatively, the remote voice mail system can be dialed direct. The instant invention is configured to operate with the call forwarding feature through a configured direct inward dial line currently available with AT&T's 5ESS and 1A switches having 256 and 257 switch types. Another type of device discovered to perform similarly if appropriately modified includes the NORTHERN TELCOM DMS100 switch. These line types are also referred to as DID User Transfer and are based upon two wire two way DID trunk lines. The direct inward dial (DID) is configured for two wire voltage reversal, two or four wire E&M with immediate or wink start depending upon the voice mail systems capability in configuration. The configured trunks allow for the voice mail system to process the callers requests and when required, perform a "hook flash" signaling the AT&T switch to provide a secondary dial tone. The system then waits and dials a preprogrammed telephone number. Since the transfer takes place at the switch located at a central office and not at a local PBX, the inbound trunks become idle and available to receive another call once the transfer is made.

The voice mail system and control of the transfer may take place in a supervised or unsupervised mode. In a supervised mode, the transfer process is monitored by the voice mail system. If the line is busy or if there is no answer, the call is retrieved and the caller given additional options such as connecting to another extension or leaving a message on a voice mail box recorder. In an unsupervised mode, the call is transferred regardless of line status. In this mode, other services such as busy line transfer, no answer transfer of service may be used to complete the processing of the call.

The system of the instant invention enables businesses the ability to utilize full auto attendant features on a remote basis, eliminating the need to purchase in-house voice mail systems. The invention works with any single or multiple line telephone system. Various embodiments of the instant invention such as the remote directory will permit a caller to reach a particular location or business merely by inputting the caller's zip codes and selection number. Another embodiment entitled voice enhanced yellow page services will allow most small and large companies to change a yellow page advertising message daily, without the need of reaching a telephone representative. A voice and broadcast facsimile service can increase their advertising ability without increasing their yellow page advertising cost. The concierge service will allow callers to ask questions wherein they can receive information by audio or facsimile and even be transferred to the restaurant of choice for reservations all from a single telephone call.

For example, incoming calls to a business are forwarded to the remote voice mail messaging and management system (VMS) The call is received by the VMS and the caller given the opportunity to transfer to a seven-digit telephone number by accessing a menu through the use of the audio tones that are directed by the telephone caller. The system can be configured as supervised or unsupervised. In the supervised mode, the selected extension is monitored and if the transferred call is not completed, the system will return the caller to a menu for additional selections. In an un-supervised mode, the caller will be transferred, and should the caller reach either a busy or unanswered extension, the caller would need to hang up and call back later.

DESCRIPTION OF THE DRAWINGS

FIG. 2 is a Loop to E&M conversion wiring guide;

DETAILED DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
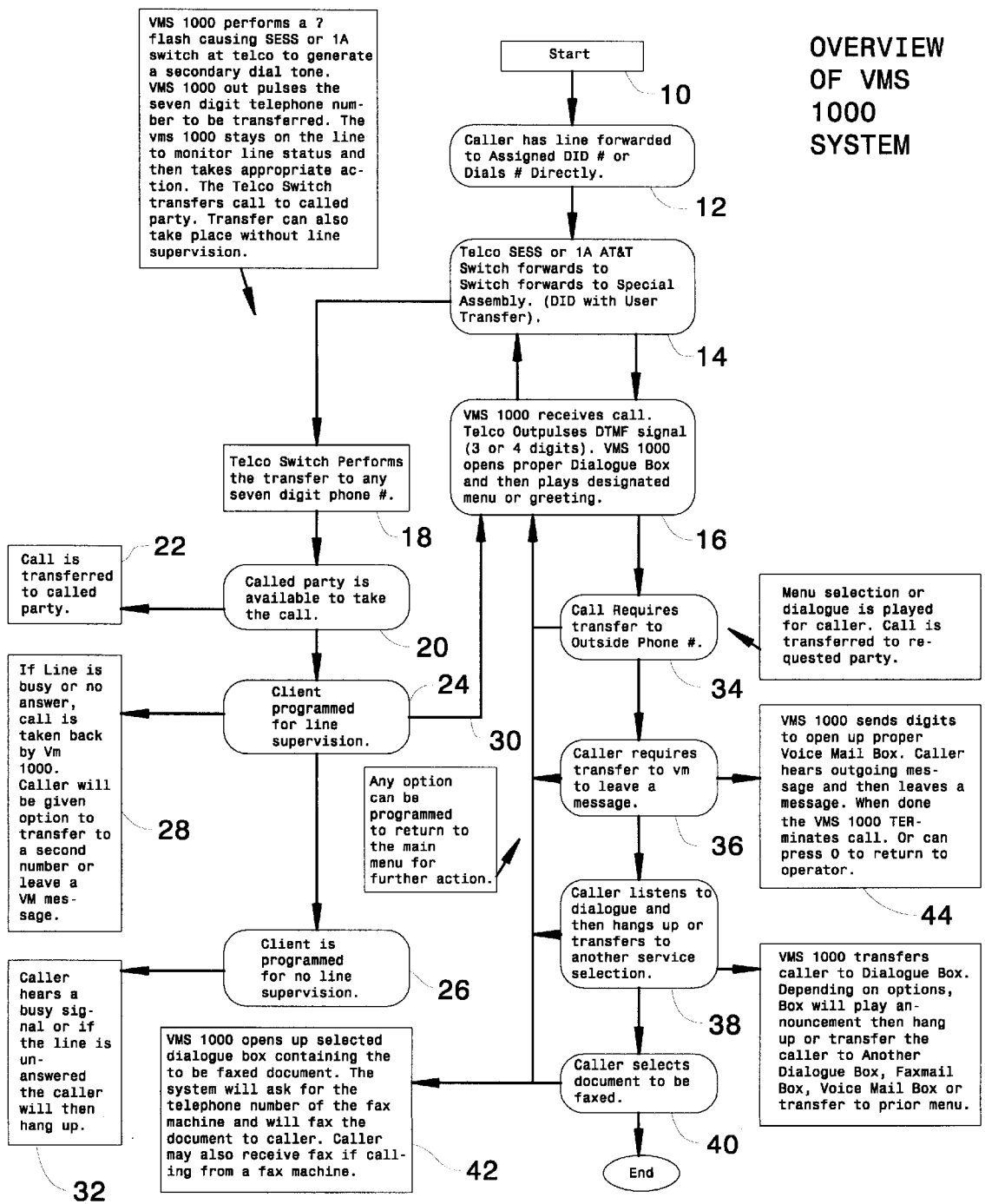
FIG. 1 is a flow diagram of the VES system demonstrating a basic call processed from start through completion.

Now referring to FIG. 1, the flow diagram sets forth an overview of the system. In operation, a telephone call 10 is made to a business 12 which has forwarded its phone calls to an assigned direct inward dial (DID) number located at a central office 14, or the telephone call can be made directly to the DID number. The central office requirements include the use of a switch with a trunk group configured to work with an AT&T 5ESS switch or 1A switches, or the equivalent such as those offered by Bell South through assembly #SE 938505, GA 922645-00, or NORTHERN TELCOM's DMS100 switch. This feature is commonly referred to as DID with user transfer.

The Voice Mail System (VMS) of the instant device 16 receives the call as forwarded through the AT&T or 1A switch on an available port. Upon receipt, the VMS device goes off hook and sends a reversal of voltage. The DID lines can be configured for two wire battery reversal, and two or four wire E&M with immediate or wink start depending upon the VMS systems capability and configuration. The central office switch 14 then sends four DTMF digits back to the VMS device 16, generally the last four digits of the phone number. These digits cause the VMS to transfer to a dialog box providing further action and processing such as playing an appropriate greeting or taking other action depending upon options provided in programming of the VIS and thereafter selected by caller. If the caller selects a function which requires the transfer to a seven digit telephone number, the system sends the caller to the appropriate dialogue box 18 programmed to make the transfer. The VMS 16 performs a hook flash and the switch 14 acknowledges by providing a dial tone. The system then sends the seven digit telephone number 18 and the transfer is completed. The VMS 16 then hangs up.

Depending on the programming selected by the business or individual user, if a called party is available to take the call 20, the call is transferred to the recipient 22. The transfer can further be made in a supervised 24 or unsupervised 26 mode. In the supervised 24 mode the VMS system is used to monitor the line 28 to make sure the transfer takes place, i.e., the line is not busy or the phone is answered. Should the line not be answered, or if the line is busy, the system will take the call back 30 and give the caller the option to try another extension or to leave a voice mail message for the called party. Should the transfer occur in the unsupervised 26 mode, the call transfer takes place 34 regardless of the line status, and should the line be busy or there is no answer, the caller will need to redial to make a connection.

Returning to the VMS, the device can be programmed to permit a caller to transfer to an outside phone number 34, leave a voice mail message 36, hear information 38, select a document that he chooses to have faxed to him 40 by providing the telephone number of the fax number which will receive the fax 42, then return to the main menu selection 34. Options can be customized to the specific need of the particular contracting business. For instance, a caller may leave a voice mail message 36 and upon completion, the VMS 44 can terminate the call 44 or return the caller to the menu selection.

In the preferred embodiment, the phone lines terminate at demarcation point at Answering Service or Service Bureau where VMS equipment is located. The connection is made through a Wescom Model 360 T1 assembly or equivalent and can be made through a direct wire connection to the voice mail system. FIG. 2 depicts the loop to E&M conversion wiring information. For the purpose of the configuration, the wiring from the phone company is connected to a Wescom T1 assembly model 360 and contains the following cards or equivalents: Wescom 3605-0 DTU, 3606-00 ALU, 3609-01 PSU, 3656-00 DID card, 3603-00 LIU card, and the 3551-68 CSU. As shown in FIG. 2, a 48 volt power supply is required to provide power to the rack assembly. The Wescom 360 is connected to a Wescom #400 rack assembly. This rack assembly utilizes Wescom #7301 Repeat Coils and Wescom #7360 Loop to E & M Cards or equivalents. This assembly is powered by a 48 volt power supply. Connections are typically made with the use of RJ 21X punch down blocks. Wescom #7360 or equivalent cards are used to convert loop start or ground start to "E" lead signaling. These cards are connected to a Trilogue Model 3000, 3200, 4000, 6500 or other equivalent voice mail system, Via RJ 21X blocks.

Figure 3:
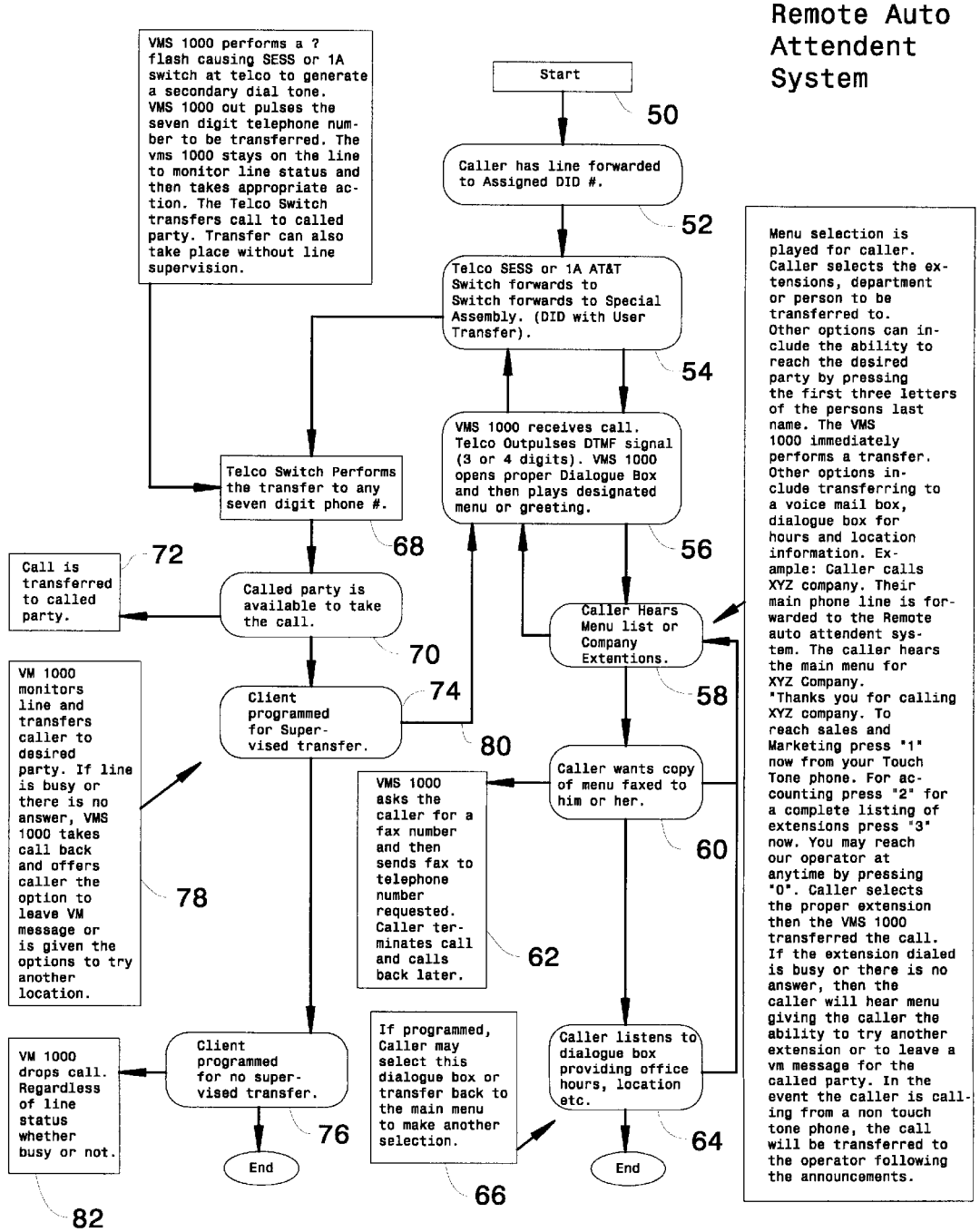
FIG. 3 is a flow diagram of an embodiment of the system set up as a remote auto attendant service.

Now referring to FIG. 3, a remote auto attendant variation of the embodiment is disclosed. The remote auto attendant is an economical system that can be shared by many users at a very cost effective rate. This system is an ideal enhanced add on feature for those businesses who utilize ESSEX and CENTREX phone services (available from various local area telephone companies) or for businesses with multiple phone lines.

In this embodiment, a telephone call 50 is made to a business 52 which has forwarded its phone calls to an assigned direct inward dial (DID) number located at a central office 54, or the telephone call can be made directly to the DID number. The caller hears a short greeting followed by a list of business extensions 58 to be selected for transfer. The greeting may sound like this. "Thank you for calling XYZ company. For accounting please press "1" now from your touch tone phone. To reach our sales office please press "2" now. For individual extensions please press "3" now." After the selection is made, the call is transferred to the proper extension.

The VMS 56 receives the call as forwarded through the AT&T or 1A switch and goes off hook and sends a reversal of voltage. The central office switch 54 then sends four DTMF digits back to the VMS device 56 to cause the VMS to transfer to the menu 58 provided in this embodiment. Prerecorded options include the use of information that can be faxed 60 to the caller upon request by simply providing the VMS with the fax number 62 via input from the remote telephone keypad allowing the VMS to automatically fax the information. Options may include the use of a recording 64 to supply the caller with office hours, location, and so forth. The caller can be transferred back to the VMS at any time 66. As with the basic system, the VMS can also be used to transfer the call to any seven digit number 68. If the caller selects a function which requires the transfer to a seven digit telephone number, the system sends the caller to the appropriate dialogue box programmed to make the transfer. The VMS 56 performs a hook flash and the switch 54 acknowledges by providing a dial tone. The system then sends the seven digit telephone number 68 and the transfer is completed. The VMS 56 then hangs up.

Depending on the programming selected by the business or individual user, if a called party is available to take the call 70, the call is transferred to the recipient 72. The transfer can further be made in a supervised 74 or unsupervised 76 mode. In the supervised 74 mode the VMS system is used to monitor the line 78 to make sure the transfer takes place, i.e., the line is not busy or the phone is answered. Should the line not be answered, or if the line is busy, the system will take the call back 80 and give the caller the option to try another extension or to leave a voice mail message for the called party. Should the transfer occur in the unsupervised 76 mode, the call transfer takes place 82 regardless of the line status, and should the line be busy or there is no answer, the caller will need to redial to make a connection. Returning to the VMS, the device can be programmed to permit a caller to transfer to the list of company extensions and leave a voice mail message 60. Other options can be added as described above.

Figure 4:
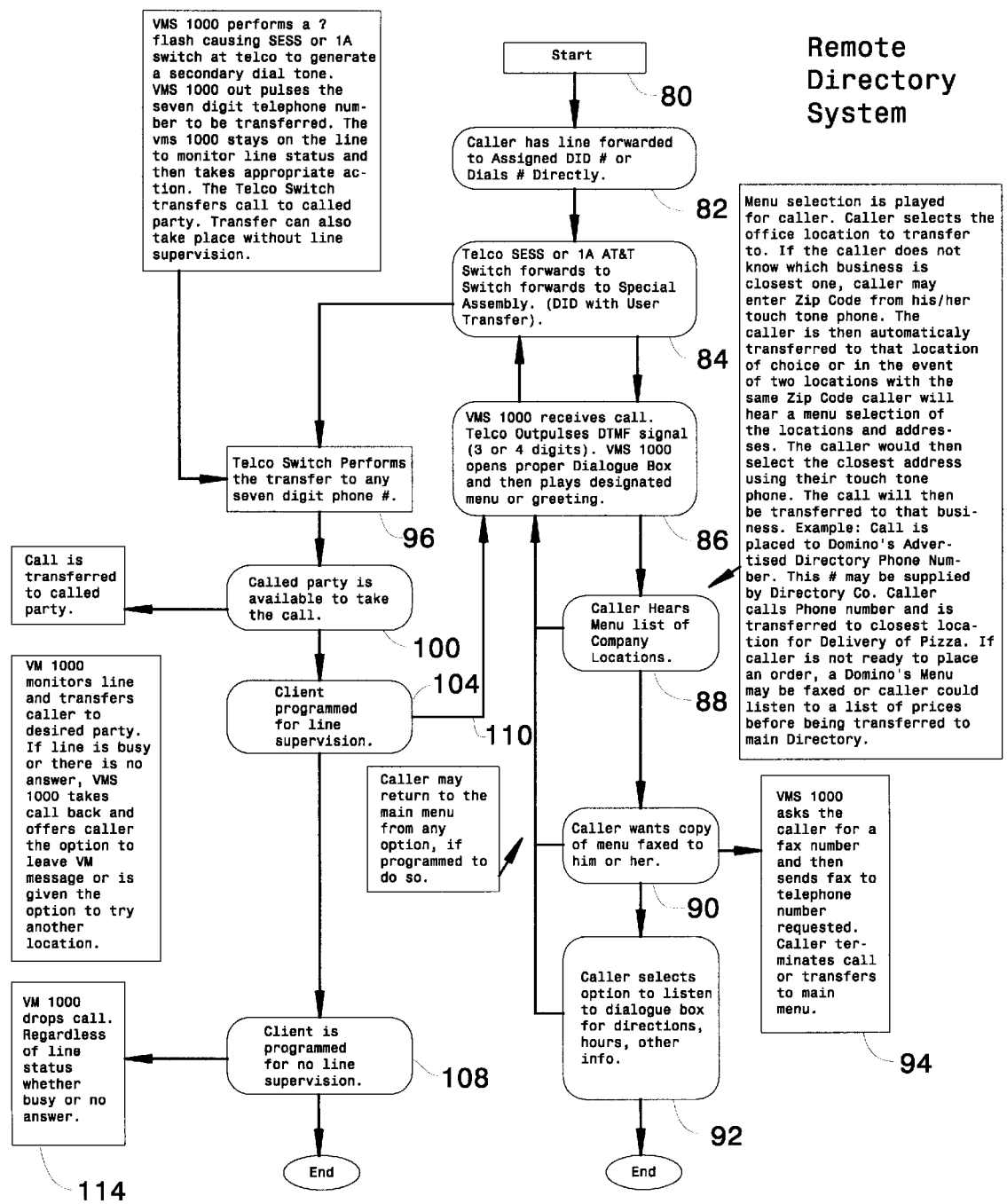
FIG. 4 is a flow diagram of an embodiment of the system set up as a remote directory system; with supervised transfer

Now referring to FIG. 4, another variation of the embodiment is disclosed in the form of a remote directory system with supervised transfer. As with the basic system the remote directory system can be shared by many users at a very cost effective rate. The system can be used as a remote directory to allow businesses the ability to consolidate their advertising efforts into a single telephone number. The VMS will allow callers the ability to locate a business easily and transfer to the selected location where multiple locations exist. The transfer can take place by way of direct selection by the caller or through a screening process such as use of the caller's zip code to determine the closest location. Other directory features include the screening of calls to assure important ones reach their proper destination.

For example, the consumer initiates a call 84 to an assigned DID provided as a directory service. The call can be made to a central office (telephone company) 86 or the telephone call can be made directly to the DID number. The call 84 is routed to the VMS 88 which acknowledges the call as shown in step 90. As part of acknowledging the call, the VMS reverses the incoming voltage, or does a "wink back". In response, the central office 86 outpulses an appropriate DTMF signal (3 or 4 digits) as shown in step 92. This causes the VMS to open a dialogue box 94 and to play a prerecorded message of menu information 96. This message might consist of the following:

"Thank you for calling (this business). Do you wish to receive a Fax detailing (various information) regarding (this business)? Enter '1' for yes, '2' for no."

If the caller selects the Fax back option as shown in 122, the caller will then be prompted for a Fax number 124 to receive the Fax. Alternatively, if the caller is calling from a Fax machine (not shown), then the caller might be prompted to hit the "start" button" on the caller's Fax machine to receive the Fax. Otherwise, the message will continue as follows:

"Please enter the code for business 1, 2, 3, or 4, or enter your zip code and you will be automatically transferred to a store serving your area."

If the caller enters the zip code as shown in step 98, the caller is transferred to an appropriate business location (see below). If several stores serve the entered zip code, then the caller might hear the following message:

"There are four stores serving your area. The stores are as follows:
Business 1 is located on Avenue A. To transfer to this store, please press '1' now;
Business 2 is located on Avenue B. To transfer to this store, please press '2' now;
Business 3 is located on Avenue C. To transfer to this store, please press '3' now;
Business 4 is located on Avenue D. To transfer to this store, please press '4' now."

If the caller enters 1, 2, 3, or 4, the caller is then transferred to the respective business as shown in steps 100, 102, 104, and 106. To achieve this transfer, the VMS does a hook flash to obtain a dial tone as shown in step 108. The VMS then sends a respective 7 digit DTMF signal as shown in step 110. The VMS executes a hook flash and conferences in the caller and the desired party as shown in 112. In this supervised configuration, the VMS monitors the line to see if the party answers as shown in 114.

If no answer by the party occurs, then an additional hook flash 116 is performed and the caller is given a list of options 118. If option one is selected, the caller is given the opportunity to leave a voice mail message 120 for the non-answering party. If option two is selected, the caller can hear the previously announced menu 96 and try another selection. If option three is chosen, the caller will be disconnected and the VMS will terminate the call. If, however, the desired party does answer, then the call is routed back to the central office 86 and the call is returned to the same line as the original inbound call, wherein the trunk is now free to receive another call. As a result, in the supervised mode, the VMS system is used to monitor the line to make sure the call transfer takes place, i.e., the line is not busy or the phone is answered.

Figure 5:
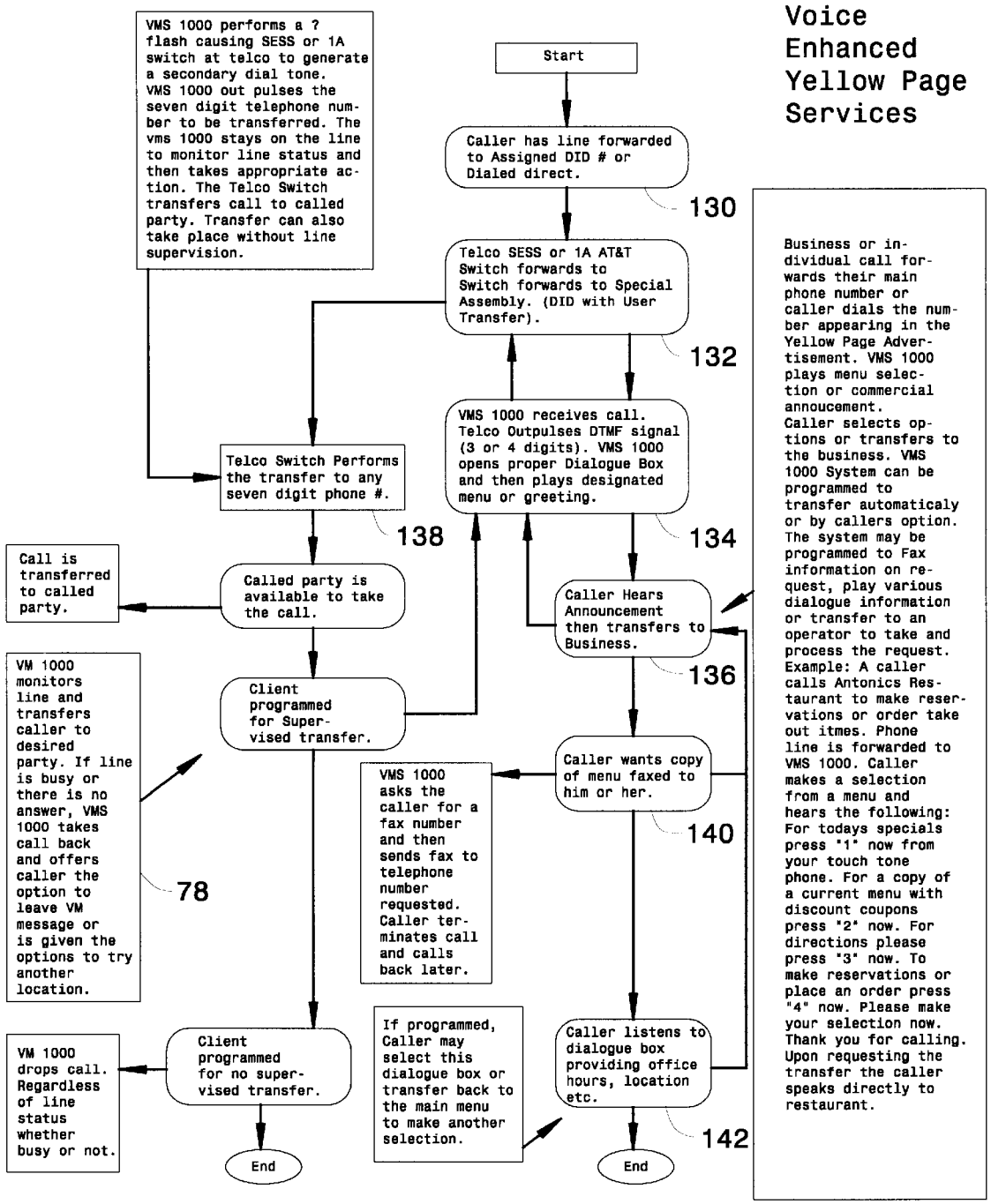
FIG. 5 is a flow diagram of an embodiment of the system set up as a remote directory system with unsupervised transfer.

Alternatively, depending upon the programming selected, the remote directory system might be configured for unsupervised transfer of incoming calls. Referring now to FIG. 5, a flowchart is shown which is similar to FIG. 4. Like FIG. 4, the caller might be prompted for a zip code, but this feature is omitted from this particular example.

After step 112, the VMS executes a hookflash and subsequently disconnects from the circuit. The caller is transferred as shown in 113 regardless of the status of the line or whether the desired party answers. Should the line be busy or there is no answer, the caller will need to redial to make a connection. By returning the call back to the VMS, as in the supervised mode, the device can be programmed to permit a caller to transfer to the list of other company locations or other options previously described.

The caller can further request directions, hours, and other information. Prerecorded options might include the use of information that can be faxed to the caller upon request by simply cuing the user to provide the VMS with the fax number via input from the remote telephone keypad. The VMS would then automatically fax the information.

Figure 6:
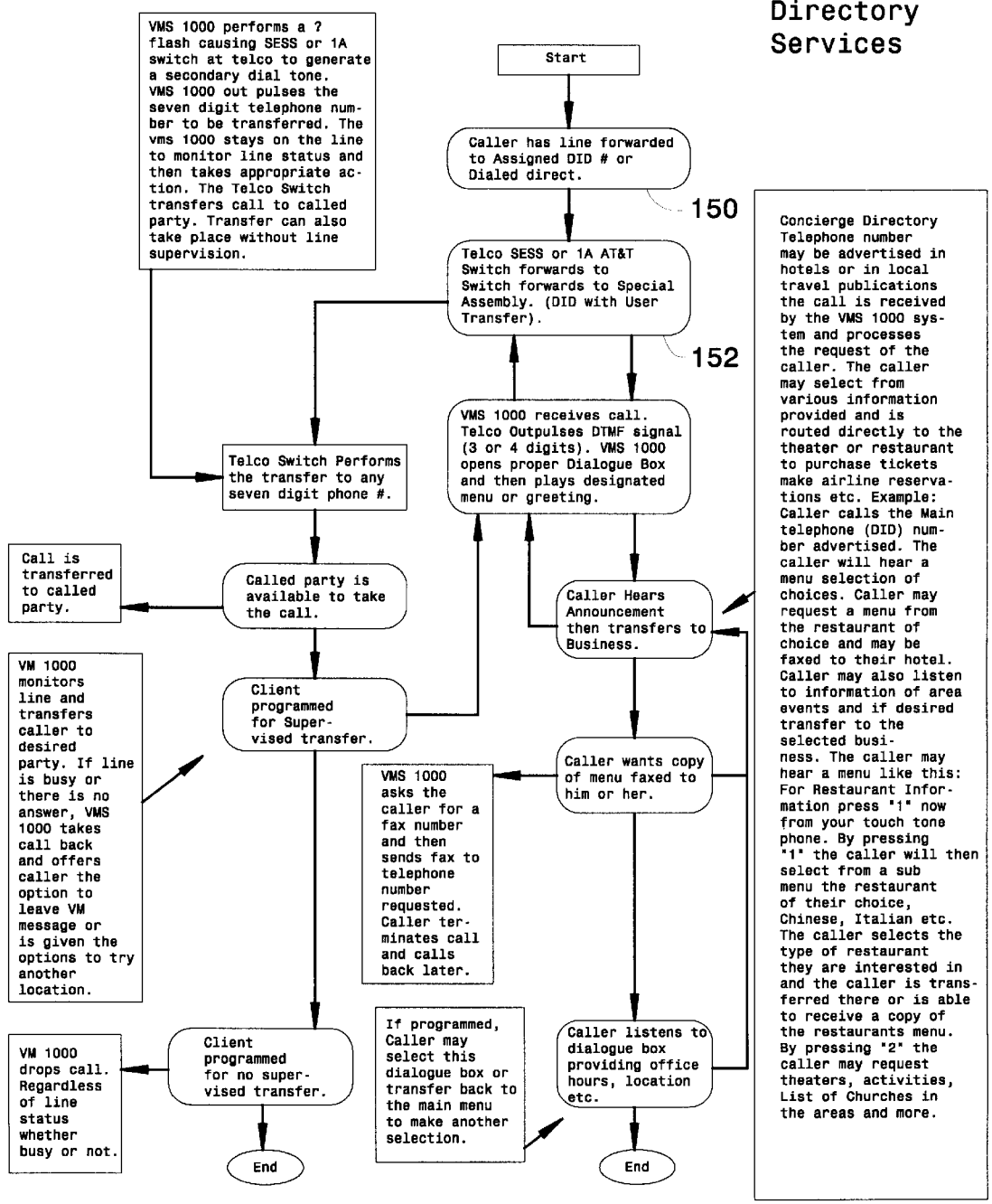
FIG. 6 is a flow diagram of an embodiment of the system set up as a voice enhanced yellow page service with unsupervised transfer.
Figure 7:
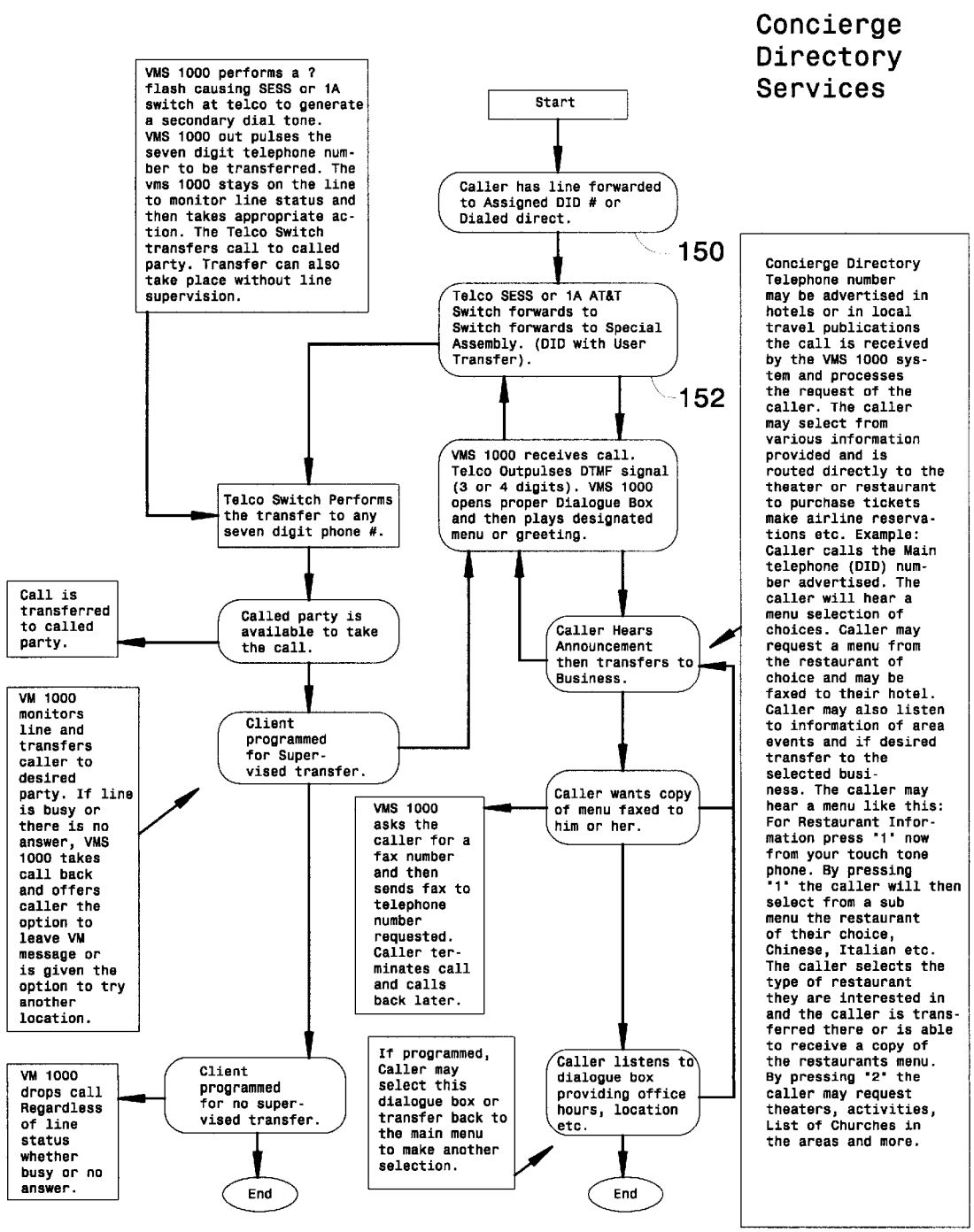
FIG. 7 is a flow diagram of an embodiment of the system set up as a concierge directory service.

FIG. 6 sets forth an enhanced voice mail yellow page service (with unsupervised transfer) to allow the business user the ability to enhance their Yellow Page advertising without purchasing additional space and provide the business user the ability to change their advertisement daily, if required. The call is processed essentially the same as those applications outlined above. The new call 130 arrives via forwarding from the business user or as a call to a phone number assigned to a client which appears in the Yellow or white pages. As before, the VMS acknowledges the incoming call and executes a reverse voltage or wink back as shown in step 132. The telephone company responds with a 4 DTMF digits 134 which in turn opens up the VMS dialogue box 136. The caller hears a commercial announcement 138 about the business called and then the caller is transferred to the business location as shown in step 140. As before, the VMS does a hook flash to obtain a dial tone 142 and the VMS sends a 7 digit DTMF signal 144. The VMS then does a hook flash and conferences the caller and desire party called as shown in 146. The VMS then disconnects and the caller is connected.

This announcement 138 can be expanded to include a small menu selection to route sales inquiries to a special dialogue box and allow all other calls to transfer to the business without interruption. In other situations a second telephone number may appear in the Yellow Page advertisement allowing a caller to hear promotional information about the company and the, when ready, to transfer to the business location. The call would also have the ability to fax references and to provide additional information about products and services to the caller. The following announcements are examples of the service once the transfer takes place.

EXAMPLE #1
Thank you for calling XYZ Cooling and Air Conditioning Company. Be sure to ask us about our summer tune up special for only $19.95. Please wait while I connect you.

EXAMPLE #2
The caller selects the special phone number supplied by the Voice Enhanced Yellow Page company. The caller hears a promotional announcement about the company. Welcome to XYZ Air Conditioning. We are a total air conditioning company and we supply an array of cooling, heating and air conditioning services. We have been serving clients in Palm Beach, Fla. for 25 years. For information about our maintenance special, please press "1" from your TOUCH TONE phone now. To speak with one of our sales representatives, please press "2" now. To repeat this announcement, please press "7" or "R" to return to the main menu.

Now referring to FIG. 6, a concierge directory service is diagramed wherein an initial call process is handled similar to those mentioned above. In this embodiment the telephone number is listed in each hotel room for use by guests or its advertisers. The caller calls the DID phone 150 number used for this purpose. The call is transferred through the switch 152 located at a central office received by the VMS 154 and then processed accordingly. The caller will hear the following information.

Thank you for calling the Concierge Automated System. Please select your request from the following menu selection.

For restaurant information please press "1" from a TOUCH TONE telephone at any time.

By pressing this selection the caller is routed to a menu of different types of restaurants. The caller can request that a menu be faxed to their hotel room or may make a reservation. When making a reservation the caller is routed directly to the restaurant of choice.

For theater information please press "2"

By making this choice the caller will be transferred to the theater of choice or may listen to the theater's listing of movies.

For a listing of churches and synagogues in the area please press "3" now.

Callers who request this menu will hear a listing of houses of worship and their locations. During office hours the call may be transferred to the office of the requested option.

For Shopping press "4" now
Callers who select this option will be played a small menu selection announcing those stores profiled. Callers could hear a slight promotional announcement, and then if desired may be transferred to the store location.

To speak with a specialist please press "5" now.
Selected callers may be transferred to an operator to further help the caller.

It is to be understood that while we have illustrated and described certain forms of our invention, it is not to be limited to the specific forms or arrangement of components herein described and shown. It will be apparent to those skilled in the art that various changes may be made without departing from the scope of the invention and the invention is not to be considered limited to what is shown in the drawings and described in the specification.

What I claim is:

1. A remote voice messaging and management system providing multiple user voice messaging and management capabilities through a directly coupled telephone connection to a publicly shared telephone company switching means located in a central office, said switching means shared by customers of said telephone company having TOUCH TONE telephone circuitry with at least one two way trunk line and in-band signaling which provides hook flash and conferencing functions, said switching means providing routing and direct coupling of a telephone call made by a customer through said at least one two way trunk line, said voice messaging and management system consisting essentially of:

a voice messaging and management device coupled to switching means by said two way trunk line, said switching means having hook flash and conferencing functions for two way truck lines and being selected from the group consisting of AT&T 5ESS, AT&T 1A, NORTHERN TELCOM DMS100 and combinations and equivalents thereof, said voice messaging and management device having a storage means for audible voice signals thereby providing voice messaging functions and a means for receiving audio tones to invoke said voice messaging functions permitting access to stored audible voice signals;

means for reversing voltage in said two way trunk line and thereby directing said switching means to provide a DTMF signal to said voice messaging and management device instructing said voice messaging and management device to access said voice messaging functions;

said voice messaging and management device including a means for momentarily disconnecting said two way trunk line and initiating a first hook flash for directing said switching means to provide a secondary dial tone to said voice messaging and management device and providing a same line return transfer of said telephone call through said switching means before placing said two way trunk line into an on-hook, stand-by position for receipt of another incoming telephone call.

2. The voice messaging and management system according to claim 1 wherein said stored audible voice signals are further defined as a plurality of menu driven prerecorded commercial announcements accessible by a caller entering audio tones through TOUCH TONE telephone circuitry coupled to said switching means, each said commercial announcement having at least one preprogrammed telephone number accessible by inputting a tone in response to one of said commercial announcements, said voice messaging and management device responsive to said tone for transferring the caller to said preprogrammed telephone number.

3. The voice messaging and management system according to claim 2 wherein said stored audible voice signals are defined as a menu driven prerecorded remote directory accessible by entering audio tones responsive to said commercial announcements, said directory further allowing a voice message to be replayed from said storage means, and wherein initiating said hook flash provides the secondary dial tone for connecting the caller to a telephone number listed in the directory.

4. The voice messaging and management system according to claim 2 wherein said prerecorded commercial announcements are yellow page advertisements having a voice message of an advertiser, said voice message replayed by accessing a menu selection of said voice messaging and management device and entering a tone responsive to said voice message, said entered tone initiating said hook flash for obtaining the secondary dial tone and connecting the caller directly to an advertiser's telephone trunk line.

5. The voice messaging and management system according to claim 1 wherein said voice messaging and management device is shared by a plurality of business establishments with said voice messaging and management device being centrally located away from each said business establishment wherein each said business establishment provides a commercial announcement and programmed telephone number whereby a caller listens to said announcement and said caller is transferred to said programmed telephone number by entering a tone responsive to said announcement.

6. The voice messaging and management system according to claim 2 wherein said commercial announcements are yellow page advertisements having a voice message and advertised telephone number of an advertiser having a telephone trunk line, said voice message is replayed by dialing said advertised telephone number and after said voice message is played, said system initiates said hook flash for obtaining a secondary dial tone and connecting said telephone call directly to said advertiser's telephone trunk line.

7. The voice messaging and management system according to claim 1, wherein said voice messaging and management device is provided DTMF digits from said telephone company which correspond to said telephone call, said DTMF digits causing said voice messaging and management device to access said audible voice signals providing voice messaging functions.

8. The voice messaging and management system according to claim 7 wherein said audible voice signals are further defined as a plurality of prerecorded commercial announcements including yellow page advertisements having a voice message of an advertiser, each said announcement being individually identified by said DTMF digits.

9. A remote voice messaging and management system providing multiple user voice messaging and management capabilities through a directly coupled telephone connection to a publicly shared telephone company switching means located in a central office, said switching means shared by customers of said telephone company having TOUCH TONE telephone circuitry with at least one two truck line and in-band signaling which provides hook flash and conferencing functions, said switching means providing routing and direct coupling of a telephone call made by a customer through said at least one two way truck line, said voice message and management system consisting essentially of:

a voice messaging and management device coupled to switching means by said two way trunk line, said switching means having hook flash and conferencing functions for two way trunk lines and being selected from the group consisting of AT&T 5ESS, AT&T 1A, NORTHERN TELCOM DMS100 and combinations and equivalents thereof, said voice messaging and management device having a storage means for audible voice signals thereby providing voice messaging functions and a means for receiving audio tones to invoke said voice messaging functions permitting access to stored audible voice signals;

means for reversing voltage in said two way truck line and thereby directing said switching means to provide a DTMF signal to said voice messaging and management device instructing said voice messaging and management device to access said messaging functions;

said voice messaging and management device including a means for momentarily disconnecting said two way truck line and initiating a first hook flash for directing said switching means to provide a secondary dial tone to said voice messaing and management device and providing a same line return transfer of said telephone call through said switching means before placing said two way truck line into an on-hook, stand-by position for receipt of another incoming telephone call; and a means for supervising line transfer of a telephone call made by a caller, said means for supervising provided by a second momentary disconnect forming a hook flash to said switching means in order to get a secondary dial tone, wherein said voice messaging and management system dials a destination telephone number and monitors the telephone call, said monitoring being used to detect a lack of telephone answer or a busy signal, wherein when an answer occurs, said voice messaging and management system provides three-way conference coupling to connect the caller with the destination telephone number, and when no answer occurs providing the caller with messaging functions.

10. A multiple user voice messaging and management system for use in combination with a switching means having hook flash and conferecing functions for two way truck lines and being selected from the group consisting of AT&T 5ESS, AT&T 1A, NORTHERN TELCOM DMS100 and combinations and equivalents thereof, electrically coupled to a plurality of two way trunk lines distributed from a telephone company central office station shared by customers of said telephone company, said telephone company station having TOUCH TONE telephone circuitry with said switching means including the function of routing and direct coupling of a telephone line to one of said two way trunk lines and a means for hook transfer and conferencing, said switching means providing a DTMF signaling tone upon voltage reversal in each said two way trunk line which provides a secondary dial tone, said messaging and management system consisting essentially of: a means for converting loop or ground start signaling to E lead signaling; a voice messaging and management device coupled to each said trunk line for receiving an incoming call, said voice messaging and management device having a storage means for audible voice signals and receiving audio tones to invoke voice messaging and management device functions for accessing stored audible menu selections, including selections for prerecorded announcements accessible by entering said audio tones through TOUCH TONE telephone circuitry; means for reversing voltage to said switching means to obtain a DTMF signaling tone used to couple a telephone line to the voice s eessaging and management device for presentation of said menu selections by said voice messaging and management device; means for momentarily disconnecting said trunk line for providing a hook flash to said switching means to obtain a secondary dial tone responsive to said audio tones carried by said telephone line over said two way trunk line thereby providing for same line return transfer of said incoming call through said switching means; means for inserting a numeric dial tone through said secondary dial tone to reach a telephone number; means four momentarily disconnecting said trunk line for providing a second hook flash to said switching means to conference call the voice messaging and management device to assist in proper transfer of said incoming call, said voice messaging and management device providing said menu selections upon lack of a telephone connection or detection of a busy signal from said transfer of said incoming call; and means for placing each said trunk line into an on-hook, stand-by position.

11. A method of providing a multiple user voice messaging and management system for receiving incoming telephone calls, comprising the steps of:

electrically coupling a voice messaging and management device to a shared telephone switch located in a telephone company central office by at least one two way telephone trunk line;

positioning a voltage card between said voice messaging and management device and said telephone switch;

storing audible voice signals in said voice messaging and management device for messaging functions;

programming said voice messaging and management device to direct said voltage card to forward a predetermined voltage to said telephone switch upon receipt of said telephone call to said voice messaging and management system;

reversing voltage between said voice messaging and management device and said telephone switch to obtain a DTMF signaling tone from said telephone switch directing said voice messaging and management device to play said audible voice signals upon receipt of inputted audio tones from said telephone call;

obtaining a secondary dial tone from said telephone switch;

transferring said telephone call from said voice messaging and management device after obtaining said secondary dial tone by dialing a prerecorded destination telephone number provided from said voice messaging and management device for direct coupling through said telephone switch; and disconnecting said dial tone from said voice messaging and management device.

12. The method of providing a multiple user voice messaging and management system according to claim 11 including a means for supervising line transfer of said telephone call by a momentary disconnection which provides a second hook flash to said switching means which is used to provide a three-way conference call between said telephone call, said destination telephone number and said voice messaging and management system with a means for monitoring said three-way conference to ensure proper transfer of said telephone call, and providing said messaging functions upon detection of a busy signal during supervising.

* * * * *

UNITED STATES PATENT AND TRADEMARK OFFICE
CERTIFICATE OF CORRECTION

PATENT NO. : 5,937,047
DATED : Aug. 10, 1999
INVENTOR(S) : Jerry Stabler

It is certified that error appears in the above-identified patent and that said Letters Patent is hereby corrected as shown below:

In col. 3, line 58, change "VES" to --VMS--.

In col. 3, delete lines 65-68 in their entirety.

In claim 1, at col. 9, line 33, change "truck" to --trunk.

In claim 9, at col. 10, line 58, after "two" insert --way--; at col. 10, line 58, col. 10, l. 62, col. 11, line 9, col. 11, line 16, col.11, line 21, change each occurrence of "truck" to --trunk.

In claim 10, at col. 11, line 39, change "truck" to --trunk.

Signed and Sealed this

Seventeenth Day of October, 2000

Attest:

Q. TODD DICKINSON

*Attesting Officer*   *Director of Patents and Trademarks*

UNITED STATES PATENT AND TRADEMARK OFFICE
CERTIFICATE OF CORRECTION

PATENT NO. : 5,937,047
DATED : Aug. 10, 1999
INVENTOR(S) : Jerry Stabler

It is certified that error appears in the above-identified patent and that said Letters Patent is hereby corrected as shown below:

IN THE FIGURES:

In Figures 1,3,4,5,6 and 7, in the uppermost left hand text box, the first line of text, change "?" to --hook--.

In Figure 2, the first line of text, change "LOOP TO B&M CONVERSION WIRING INFORMATION" to --LOOP TO E&M CONVERSION WIRING INFORMATION--; the second line of text, change "TRILOGUE E&M PORT" to --TRILOGUE E&M PORT--.

IN THE SPECIFICATION:

In col. 3, line 58, change "VES" to --VMS--.

In col. 3, delete lines 65-68 in their entirety.

UNITED STATES PATENT AND TRADEMARK OFFICE
CERTIFICATE OF CORRECTION

PATENT NO. : 5,937,047
DATED : Aug. 10, 1999
INVENTOR(S) : Jerry Stabler

It is certified that error appears in the above-identified patent and that said Letters Patent is hereby corrected as shown below:

<u>IN THE CLAIMS:</u>

In claim 1, at col. 9, line 33, change "truck" to --trunk.

In claim 9, at col. 10, line 58, after "two" insert --way--;
at col. 10, line 58, col. 10, l. 62, col. 11, line 9, col. 11,
line 16, col.11, line 21, change each occurrence of
"truck" to --trunk.

In claim 10, at col. 11, line 39, change "truck" to --trunk.

Signed and Sealed this

Twenty-third Day of January, 2001

Attest:

Q. TODD DICKINSON

*Attesting Officer*

*Commissioner of Patents and Trademarks*